United States Patent [19]

Matsueda

[11] Patent Number: 5,164,933
[45] Date of Patent: Nov. 17, 1992

[54] READING SIGNAL PROCESSING CIRCUIT IN OPTICAL INFORMATION REPRODUCING APPARATUS

[75] Inventor: Akira Matsueda, Tachikawa, Japan

[73] Assignee: Olympus Optical Co., Ltd., Tokyo, Japan

[21] Appl. No.: 802,669

[22] Filed: Dec. 5, 1991

[30] Foreign Application Priority Data

Dec. 7, 1990 [JP] Japan .................. 2-400887

[51] Int. Cl.⁵ ............................................. G11B 7/00
[52] U.S. Cl. ................................... 369/59; 369/54; 369/32; 369/124
[58] Field of Search .............. 369/59, 124, 44.25, 369/54, 100, 109, 110, 32, 124; 360/46, 40, 114, 39; 358/342

[56] References Cited

U.S. PATENT DOCUMENTS

| | | | |
|---|---|---|---|
| 4,475,183 | 10/1984 | Marchant et al. | 369/59 X |
| 4,743,774 | 5/1988 | Maeda et al. | 369/124 X |
| 4,764,916 | 8/1988 | Mori | 369/59 X |
| 4,939,710 | 7/1990 | Fuji et al. | 369/124 X |
| 4,954,903 | 9/1990 | Fuji et al. | 360/46 |
| 4,975,897 | 12/1990 | Tanahashi | 360/46 X |

FOREIGN PATENT DOCUMENTS 0156555 10/1985 European Pat. Off. .............. 469/59

*Primary Examiner*—Roy N. Envall, Jr.
*Assistant Examiner*—Hung Dang
*Attorney, Agent, or Firm*—Armstrong & Kobovcik

[57] ABSTRACT

In this invention, a reading signal detected by a photodetector is input into two differentiating circuits of different differential constants. The first differentiating circuit differentiates the reading signal with the differential constant larger than that of, for example, the second differentiating circuit and lowers the level of the noise component present as mixed in the reading signal. The first comparing circuit removes the noise component, for example, below the threshold value. The second differentiating circuit differentiates the reading signal with the differential constant converting the peak point of the reading signal, for example, of the above mentioned photodetector to a zero crossing point. The second comparing circuit compares the differential signal of the above mentioned differentiating circuit with the threshold value set, for example, on the zero level and makes the output signal rise, for example, in the center position of an information pit. A bivalued signal logical circuit obtains a bivalued signal made by bivaluing the reading signal from the respective output signals of the first and second comparing circuits.

8 Claims, 7 Drawing Sheets

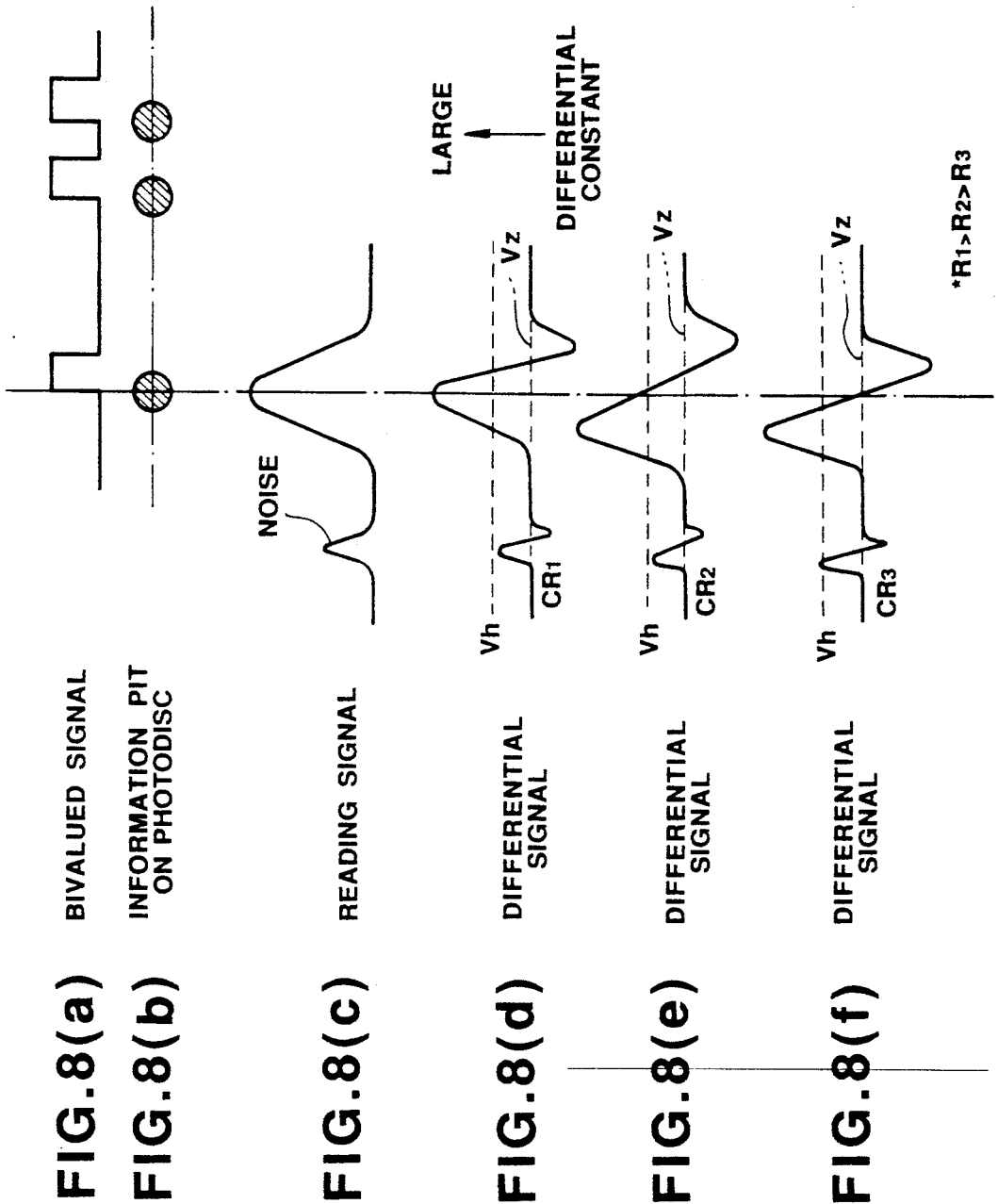

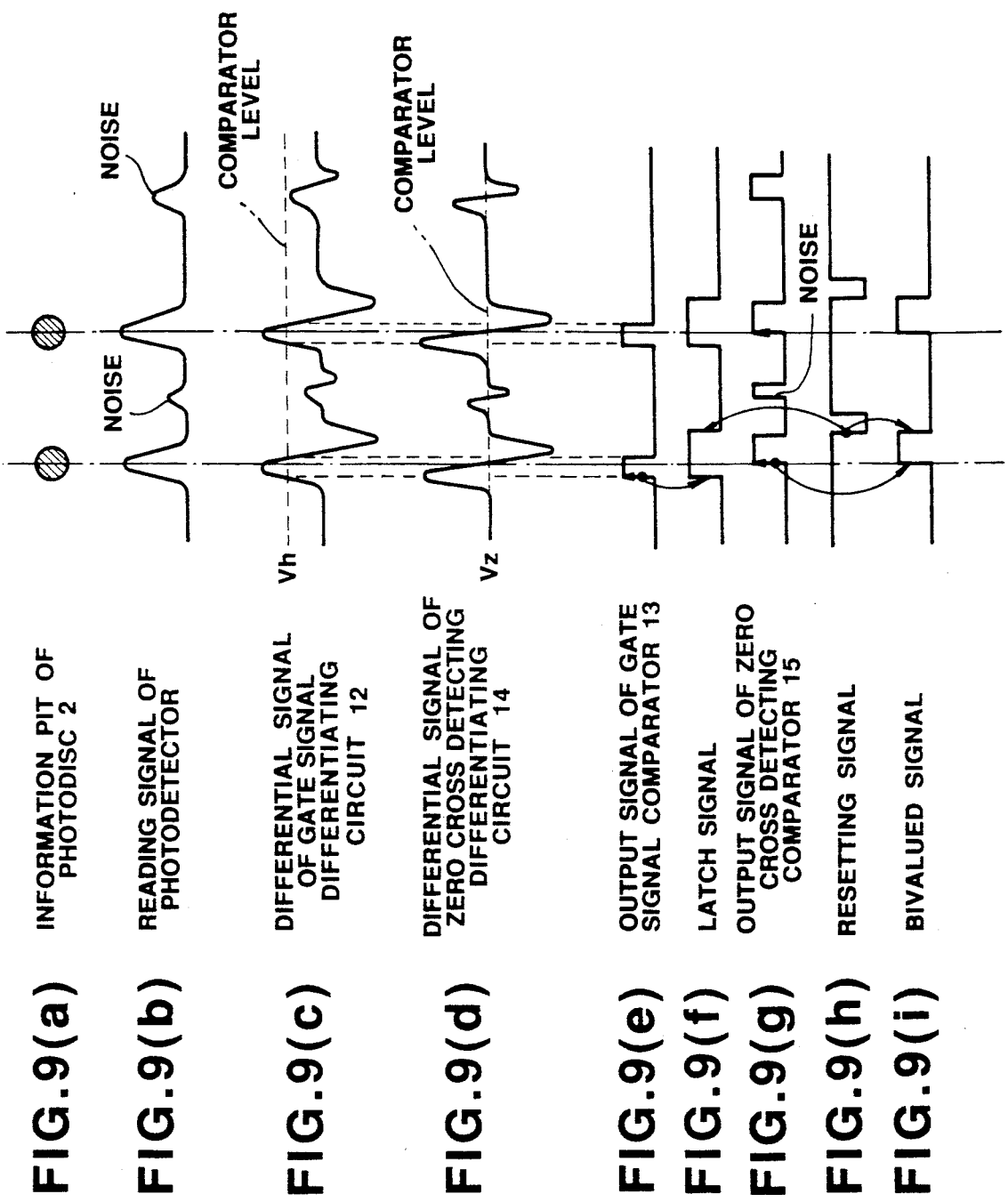

5,164,933

READING SIGNAL PROCESSING CIRCUIT IN OPTICAL INFORMATION REPRODUCING APPARATUS

BACKGROUND OF THE INVENTION

1. Field of the Invention

This invention relates to a reading signal processing circuit in an optical information reproducing apparatus for optically reading the information out of a recording medium.

2. Related Art Statement

Recently there is practiced an optical information recording and reproducing apparatus wherein, by condensing and radiating a laser light on a recording medium instead of using a magnetic head, information can be optically written in or recorded information can be read out.

In such optical information recording and reproducing apparatus (which may be abbreviated merely as a recording and reproducing apparatus in some case hereinafter), by condensing a laser light, the information can be recorded or reproduced at a density far higher than in the case of a magnetic head.

In the above mentioned recording and reproducing apparatus, there is a position recording or a length recording in the recording system in the recording medium. For example, in the position recording, the information is recorded by making the position of a recording unit (pit) significant. In such case, generally the distance from the center of a pit to the center of the next pit is made significant and this distance corresponds to the pit length in the length record.

The reading signal processing circuit of the position recording system is formed to detect the center of the pit. The size of the formed pit varies with the dispersion of the sensitivity of each recording medium, the dispersion of the sensitivity of the recording medium by the temperature (variation) and the fluctuation of the reading power of the light source. Even if such variation occurs, the center position of the pit will not vary. That is why the position recording system is suitable to obtain a normal reproduced signal.

FIG. 1 shows a block diagram of a reading signal processing circuit in a reading signal processing system of a related art. FIG. 2 is a waveform diagram showing the operation of the reading signal processing circuit shown in FIG. 1.

A reading signal processing circuit 30 shown in FIG. 1 is to bivalue a reading signal detected by a photodetector within an optical head. As shown in FIG. 1, a differentiating circuit 31 inputs and differentiates the reading signal from the photodetector shown in FIG. 2(a). The peak of the reading signal has been converted to a zero crossing point in the differentiated signal as shown in FIG. 2(b). Comparators 32 and 33 have respectively different comparator levels. In the comparator 32, when the input signal exceeds the comparator level, the output signal will be on a high level. In the comparator 33, when the input signal is below the comparator level, the output signal will be on a high level. One comparator 32 is to detect whether there is a pit or not and sets a comparator level Vh to be higher than the zero crossing point of the differentiated reading signal. In case the above mentioned reading signal exceeds the comparator level Vh, this comparator 32 will judge it to be of a pit and will output a gate signal on a high level as shown in FIG. 2(c). As synchronized with this gate signal, a latch signal shown in FIG. 2(d) will be generated within a bivalued signal generating logical circuit 34.

On the other hand, the other comparator 33 inputs a comparator level Vz inverting the output with the zero crossing of the reading signal from the photodetector. The comparator 33 outputs a zero crossing signal shown in FIG. 2(e) to the bivalued signal generating logical circuit 34. When the above mentioned latch signal is on a high level, the bivalued signal generating logical circuit 34 will output a bivalued signal of a required fixed pulse width shown in FIG. 2(f) at the rising edge of the zero crossing signal and then will clear the latch signal. Thus, in response to the pit on the recording medium, the reading signal processing circuit 30 sequentially outputs a bivalued signal but, in some case, noises will be generated in the reading signal as shown in FIG. 2(a). for example, by the flaws and dirts on the recording medium. As shown in FIGS. 2(c) and (e), when the level of the noise is large enough to exceed the comparator level Vh, and a gate signal will be generated. Therefore, the bivalued signal generating logical circuit 34 will output a wrong (though there is no pit) bivalued signal. By the way, in case the noise level does not exceed the comparator level Vh, even if a zero crossing signal by the noise is output, the bivalued signal generating circuit 34 will not output a bivalued signal.

However, if the noise components of the input reading signal are few and the noise level is low, the reading signal processing circuit of the above described related art will not be a problem but, in the actual reading very many noises will occur and the signal mixed with noises will have to be processed. There are such various causes of noises as, for example, dust and dirt or flaws on the recording medium, noises generated within such apparatus as a photodetector and noises from a power source line. Thus, in the reproducing apparatus, a noise level larger than the comparator level is likely to be generated and therefore, in the circuit of the above mentioned related art many reading errors by noises may be generated.

Now, as one of the countermeasures against such defects, there is a method wherein a high order filter is put into the input of the circuit but, in case the frequency component of the noise is within the signal band of the filter, it will not be effective. Even in the region where it is effective, the time delay of the signal by the filter will newly become a problem and the circuit scale and cost will both become large.

Also, as another countermeasure, it is considered to make the differential constant of the above mentioned differentiating circuit larger and to make the size of the noise component for the signal component relatively small. However, in the above mentioned conventional reading signal processing circuit, the peak of the reading signal will not be converted to a zero crossing point and a bivalued signal will not be generated in the center of the pit. Therefore, the bivalued signal will be influenced by the size of the pit on the recording medium and the jitters will become large. That is to say, a reading error will be generated.

Thus, in the conventional reading signal processing circuit, a reading error by a noise will be generated and, even if the differential constant is made larger to prevent the reading error, jitters will become larger and a reading error will be generated.

OBJECTS AND SUMMARY OF THE INVENTION

An object of this invention is to provide a reading signal processing circuit in an optical information reproducing apparatus wherein there is produced a bivalued signal which will not mis-detect as an information pit by mistake a reading error by a noise even if it occurs and the reading reliability is high.

Another object of this invention is to provide a reading signal processing circuit in an optical information reproducing apparatus wherein there is produced a bivalued signal in which noise, which could result in a reading error, will not be mis-detected as an information pit (even if it occurs), that is, will be strong to the noise and will have no jitters and no time delay of the signal and wherein the reading reliability is high.

Briefly, in an optical information reproducing apparatus comprising an optical head having a light source generating a reproducing light beam for reading the recorded information out of a recording medium and a photodetector detecting the reflected light from the recording medium and a reading means reproducing the information, this invention relates to a reading signal processing circuit included in the above mentioned reading means and outputting a bivalued signal by processing the reading signal from the photodetector. The reading signal processing circuit of this optical information reproducing apparatus comprises a first differentiating means differentiating the reading signal from the above mentioned photodetector with a set differential constant, a second differentiating means differentiating the reading signal from the above mentioned photodetector with a differential constant different from that of the above mentioned first differentiating means, a first comparing means comparing the differential signal output by the above mentioned first differentiating means with a set threshold value and outputting the signal, a second comparing means comparing the differential signal output by the above mentioned second differentiating means with a threshold value different from that of the first comparing means and outputting the signal and a bivalued signal logical means producing and outputting a bivalued signal corresponding to the recorded information in the above mentioned recording medium by receiving the output signal of the first comparing means and the output signal of the second comparing means.

The other features and advantages of the present invention will become apparent enough with the following detailed explanation

BRIEF DESCRIPTION OF THE DRAWINGS

FIGS. 8a-8f are waveform diagrams showing the relations of input and output signals with the variation of the differential constant in the circuit of FIG. 6.

FIGS. 9a-9i are waveform diagrams for explaining the operation of the circuit of FIG. 3.

BEST MODE FOR CARRYING OUT THE INVENTION

Figure 4:
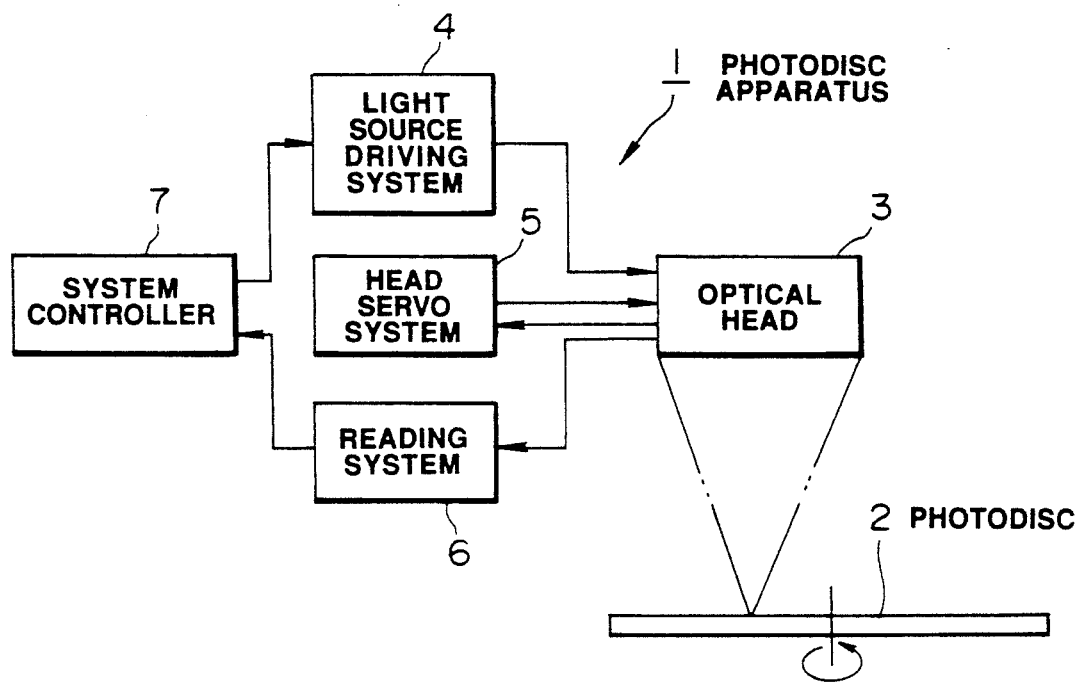
FIG. 4 is a schematic formation diagram of a photodisc apparatus.

An optical disc apparatus 1 as of an optical information recording/reproducing apparatus shown in FIG. 4 comprises an optical head 3 having a light source not illustrated radiating a reproducing/recording light beam and a photodetector not illustrated detecting the reflected light of a photodisc 2 as a recording medium, a light source driving system 4 driving and controlling the above mentioned light source, a head servo system 5 optimumly controlling the focusing and tracking of the reproducing/recording light beam, a reading system 6 digitally converting the reading signal from the above mentioned optical head 3 and a system controller 7 controlling such entire apparatus as the above mentioned light source driving system 4 and demodulating recorded and read data.

The above mentioned optical head 3 is formed of such light source as, for example, a laser diode, an optical system not illustrated and an actuator not illustrated controlling the focusing and tracking of a light spot. The above mentioned laser diode radiates a properly tracked laser light to the rotating photodisc 2 and the above mentioned photodetector receiving the reflected light detects the information recorded on the photodisc 2.

By the reading/recording controlling signal from the system controller 7, the above mentioned light source driving system 4 controls the current fed to the above mentioned laser diode. The above mentioned laser diode will power a beam of a low output at the time of reading but will power a beam of a high output corresponding to the modulated recorded information at the time of recording.

The above mentioned head servo system 5 drives the optical head 3 on the basis of the tracking error signal from the above mentioned photodetector and controls following the track on the photodisc 2 and the seeking operation.

Also, the above mentioned reading system 6 has a later described reading signal processing circuit bivaluing the reading signal from the above mentioned Photodetector and outputs the bivalued signal to the system controller 7.

Figure 1:
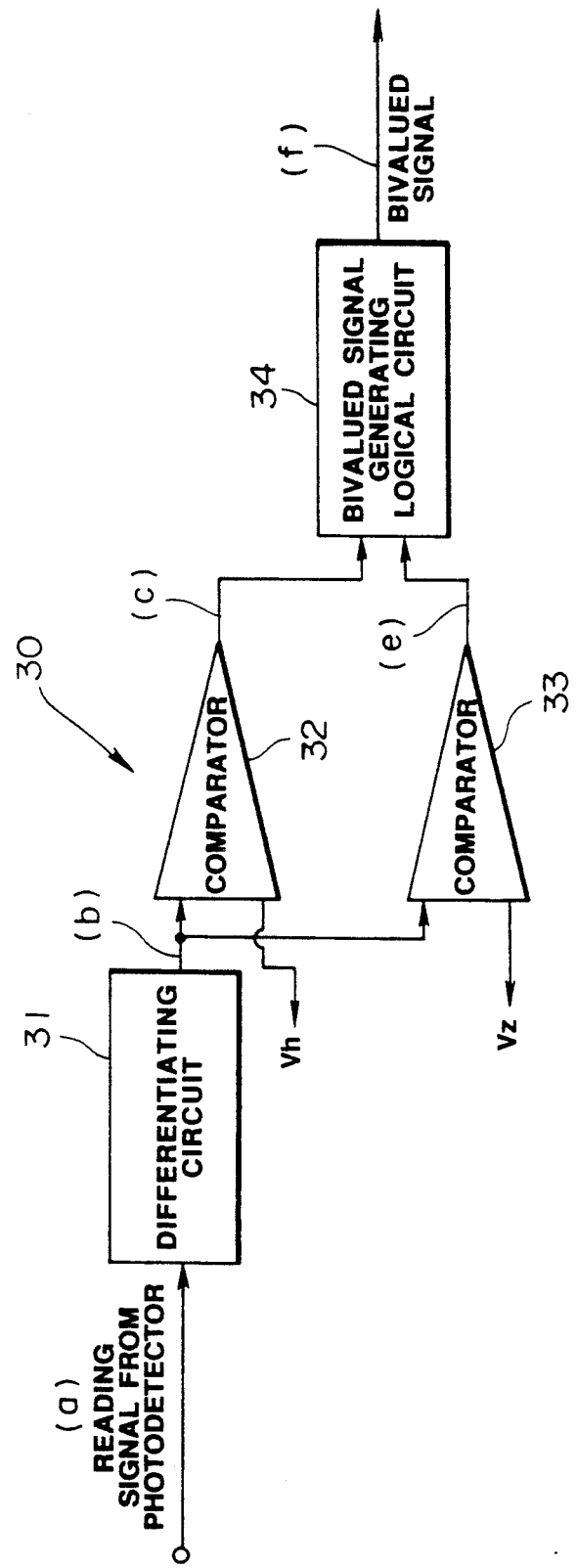
FIG. 1 is a block diagram of a reading signal processing circuit of a related art.
Figure 2:
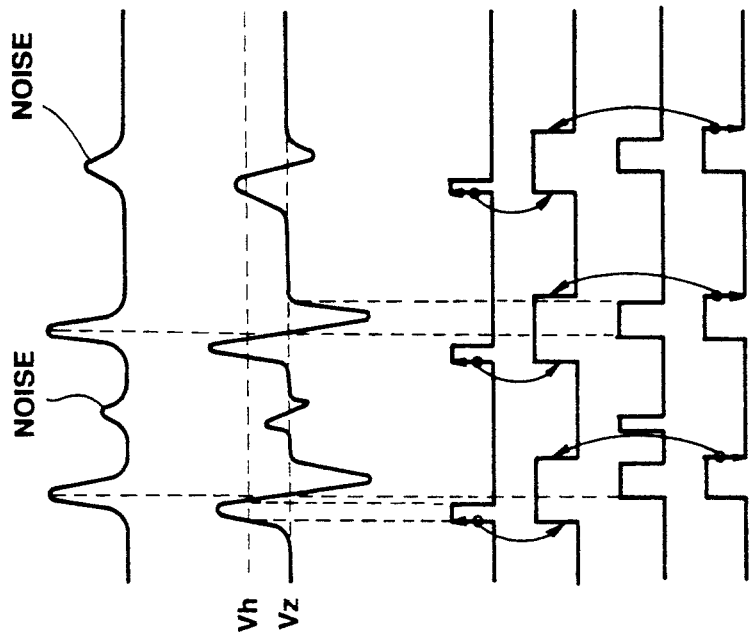
FIGS. 2a-2f are waveform diagrams showing the operation of the reading signal processing circuit of the related art.
Figure 3:
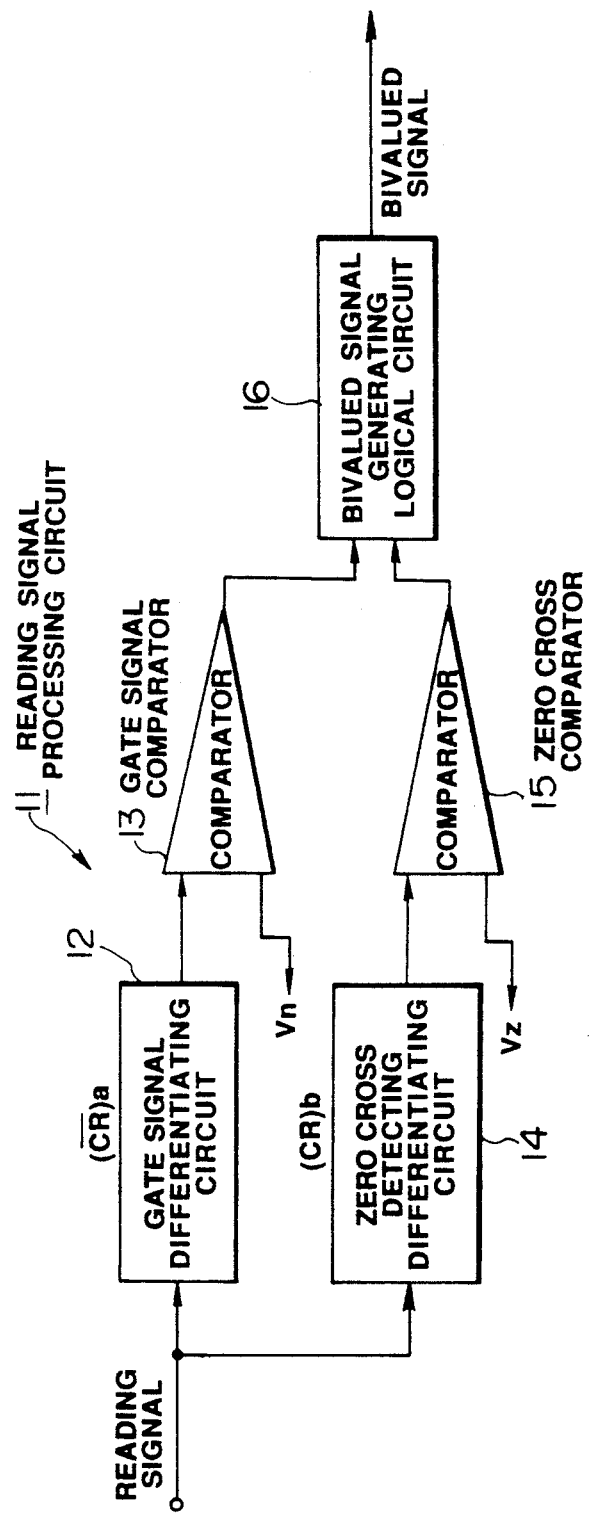
FIG. 3 is a schematic formation diagram of a reading signal processing circuit.

FIG. 3 shows the formation of the above mentioned reading signal processing circuit. This reading signal processing circuit 11 comprises a gate signal differentiating circuit 12 as a first differentiating means, a gate signal comparator 13 as a first comparing means, a zero crossing detecting differentiating circuit 14 as a second differentiating means, a zero crossing detecting comparator 15 as a second comparing means and a bivalued signal generating logical circuit 16 as a bivalued signal logical means.

The above mentioned gate signal differentiating circuit 12 and zero crossing detecting differentiating circuit 14 receive the reading signal from the above mentioned photodetector, differentiate it respectively with different differential constants (time constants) and output the respective differential signals respectively to the gate signal comparator 13 and zero crossing detecting comparator 15. The gate signal comparator 13 and zero crossing detecting comparator 15 set respectively different threshold values, the gate signal comparator 13 is on a high level above the threshold value and the zero crossing detecting comparator 15 is on a high level below the threshold value. The bivalued signal generating logical circuit 16 outputs a bivalued signal corresponding to the information pit of the photodisc 2 on the basis of the respective outputs of the gate signal comparator 13 and zero crossing detecting comparator 15.

A time constant comparatively larger than that of the zero crossing differentiating circuit 14 is set in the above-mentioned gate signal differentiating circuit 12. Therefore, the gate signal differentiating circuit 12 can keep low the level of the noise mixed in the reading signal of the photodetector.

Here, the relation between the size of the time constant and the input and output signals of the differentiating circuit as recorded by the position recording system shown in FIG. 8(b) shall be explained in the following by using the fundamental differentiating circuit shown in FIG. 6. By the way, FIG. 8(a) shows the optimum bivalued signal corresponding to the center position of the information pit in the case of the position recording.

Figure 6:
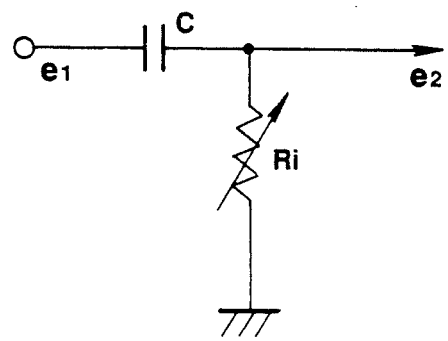
FIG. 6 is a formation diagram of a fundamental differentiating circuit.
Figure 7:
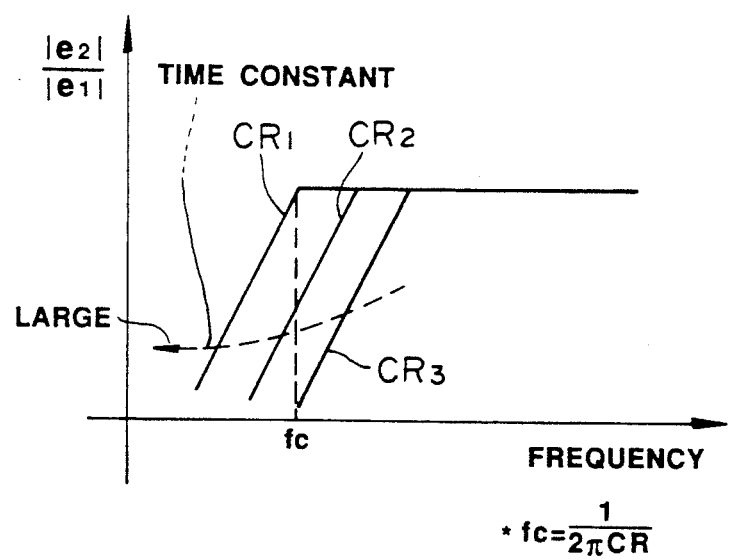
FIG. 7 is a characteristic diagram showing differential characteristics of the differentiating circuit of FIG. 6.

The differentiating circuit in FIG. 6 is to obtain an output voltage e2 generated at the other end of a variable resistor Ri grounded at one end through a condenser C inputting an input voltage el. The characteristics of this differentiating circuit are that, as shown in FIG. 7, when the time constants are made gradually larger as in CR3, CR2 and CR1, the cutoff frequency ($fc = \frac{1}{2}\pi CR$) will gradually become lower. Where, in FIG. 8, the ordinate represents the ratio of the respective absolute values of the input voltage el and output voltage e2 and the abscissa represents the frequency of the input signal.

The above mentioned photodetector outputs the reading signal shown in FIG. 8(b) in response to the information pit of the photodisc 2 shown in FIG. 8(a) and the differentiating circuit in FIG. 6 differentiates and outputs the reading signal. At this time, in the output of the differentiating circuit, if the time constant CRi of the circuit is made gradually larger, the zero crossing point will gradually deviate from the peak point of the reading signal as shown in the order of FIGS. 8(f), (e) and (d). However, on the other hand, if the time constant becomes larger, in the output of the differentiating circuit, as shown in FIG. 7, the cutoff frequency will lower and therefore the low range component will become larger than when the time constant is small. Therefore, the level of the noise component will be inversely proportional to the size of the time constant. In case the time constant of the differentiating circuit is made larger, the level of the noise component will become lower and therefore, if the comparator level Vh of the comparator is properly set, as shown in FIG. 8(d), the noise level will be able to be made lower than this comparator level Vh and the mis-detection on the comparator side will be able to be prevented.

In this embodiment, as shown in FIG. 8(f), the time constant CRb of the zero crossing detecting differentiating circuit 14 is set so that the zero crossing point of the above mentioned reading signal corresponds to the peak of the above mentioned reading signal. Also, the time constant CRa of the gate signal differentiating circuit 12 is set to be larger than the time constant CRb of the zero crossing detecting differentiating circuit 14 so that the noise level may be reduced.

Further, in the above mentioned zero crossing detecting comparator 15, the comparator level Vz is set at the intermediate point of the peak to peak of the differential signal to detect the zero crossing of the reading signal. That is to say, at the peak point of the above mentioned reading signal, the output signal is made to rise and the center of the above mentioned information pit is detected. The comparator level Vh of the gate signal comparator 13 is set to be higher than the noise level output by the gate signal differentiating circuit 12 and to be lower than the peak level of the differentiated signal as shown in FIG. 8(d).

Figure 5:
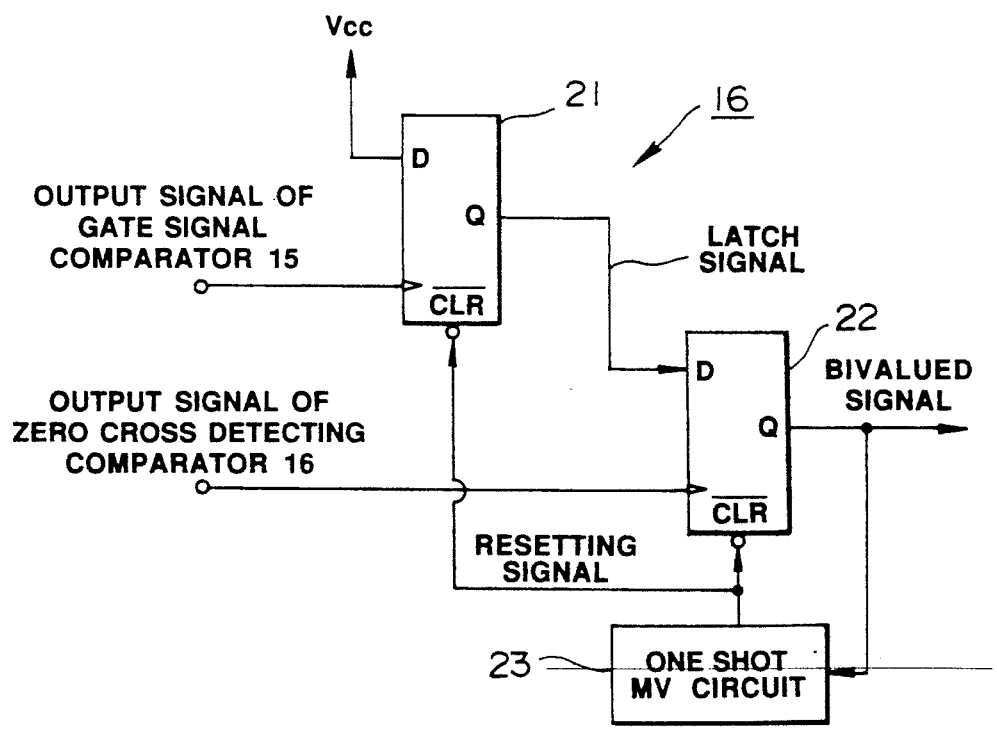
FIG. 5 is a formation diagram of a bivalued signal generating logical circuit.

FIG. 5 shows a concrete circuit example of the above mentioned bivalued signal generating logical circuit 16. This bivalued signal generating logical circuit 16 comprises a first D flip-flop (abbreviated as 1st D-FF hereinafter) 21 inputting the output signal of the above mentioned gate signal comparator 13 into a clock terminal (CLK terminal), a second D flip-flop (abbreviated as 2nd D-FF hereinafter) 22 inputting the output signal of the zero cross detecting comparator 15 into a clock terminal (CLK terminal) and a one-shot multivibrator (MV) circuit 23 for clearing the respective outputs of the 1st D-FF 21 and 2nd D-FF 22. The 1st D-FF 21 wherein a data terminal D is connected to a power source Vcc outputs a latch signal from an output terminal Q by the timing of the rise of the output signal of the above mentioned gate signal comparator 13. The 2nd D-FF 22 inputting this latch signal into the data terminal D brings the bivalued signal to a high level from the output terminal Q by the timing of the rise of the output signal of the above mentioned zero crossing detecting comparator 14. From the rise of the bivalued signal output by the 2nd D-FF 22, after a fixed time (one shot time) set within, the above mentioned one shot MV circuit 23 makes a resetting signal fall. By the timing of the fall of the above mentioned resetting signal, the 2nd D-FF 22 brings the bivalued signal to a low level. That is to say, the pulse width of the obtained above mentioned bivalued signal is determined to be for a fixed time by the one shot time of the above mentioned one shot MV circuit 23.

The operation of this embodiment shall be explained in the following with reference to FIG. 9.

The above mentioned photodetector outputs the reading signal shown in FIG. 9(b) corresponding to the information pit shown in FIG. 9(a). The gate signal differentiating circuit 12 outputs to the gate signal comparator 13 the differential signal shown in FIG. 9(c) differentiated with the time constant CRa. When the gate signal differential signal is above the comparator level Vh, the gate signal comparator 13 will be on a high level. At this time, as the time constant CRa of the gate signal differentiating circuit 12 is set to be large, as shown in FIG. 9(e), it will not be on a high level by the noise component.

On the other hand, the zero crossing detecting differentiating circuit 14 differentiates the reading signal of the above mentioned photodetector with the time constant CRb and outputs to the zero crossing detecting comparator 15 a differential signal in which the peak of the reading signal is converted to the zero crossing as shown in FIG. 9(d). The zero crossing detecting comparator 15 outputs the gate signal differential signal on a high level below the comparator level Vz and zero-crossed as shown in FIG. 9(g).

The 1st D-FF 21 of the bivalued signal generating logical circuit outputs from the output terminal Q the latch signal high level shown in FIG. 9(f) by the timing of the rise of the output signal of the gate signal comparator 13 shown in FIG. 9(e). When the data terminal D is in the latch signal high level state and the output signal of the zero crossing detecting comparator 15 shown in FIG. 9(g) rises, by this timing, the 2nd D-FF 22 will output from the output terminal Q the bivalued signal high level shown in FIG. 9(i). At this time, in the one shot MV circuit 23, after a fixed time from the timing of the rise of the bivalued signal, the resetting signal shown in FIG. 9(h) will be on a low level. By the timing of the fall of the resetting signal of the one shot MV circuit 23, the 1st D-FF 21 and 2nd D-FF 22 will have the output on a low level. Therefore, the 2nd D-FF 22 will make the bivalued signal rise by the timing of the peak of the above mentioned reading signal and will make the bivalued signal fall after the time (of the pulse width required for the bivalued signal) while the one shot MV circuit 23 is determined.

In this embodiment, the reading signal detected by the photodetector is received by two differentiating circuits. One gate signal differentiating circuit 12 differentiates the reading signal with a large differential constant and therefore can lower the level of the noise component mixed in the reading signal. Further, the gate signal comparator 13 can remove the noise component below the comparator level Vh set to be high.

The other zero crossing detecting differentiating circuit 14 differentiates the reading signal with an optimum differential constant positively converting the peak point of the reading signal of the photodetector to a zero crossing point. The zero crossing detecting comparator 15 can positively detect as a rise of the output signal the peak point (center position of the information pit) of the reading signal by comparing it with a comparator level Vz set on the zero level of the signal.

Further, in the above mentioned bivalued signal generating logical circuit 34, only when the latch signal produced by the timing of the gate signal except the influence of the noise is high, the above mentioned bivalued signal will be made to rise by the timing of the rise of the output of the above mentioned zero crossing detecting comparator 15. Also, the bivalued signal is made to fall by a fixed time width irrespective of another signal, for example, a zero crossing signal from the fall of this bivalued signal. Therefore, the reading signal processing circuit 30 of this embodiment can obtain a bivalued signal strong against noises and having no jitters or no signal delay.

If the output signal of the zero crossing detecting comparator 15 is made a bivalued signal without using the above mentioned latch signal, the noise component will be also bivalued to be a mis-detected signal.

By the way, in this embodiment, a photodisc is exemplified as a recording medium. However, the embodiment can be applied also to an apparatus using an optical card.

It is apparent that, in this invention, working modes different in a wide range can be formed on the basis of the spirit of the invention. This invention is not restricted by its specific working modes except being limited by the appended claims.

What is claimed is:

1. In an optical information reproducing apparatus including an optical head having a light source for generating a reproducing light beam for reading recorded information out of a recording medium; a photodetector for detecting reflected light from said recording medium; and a reading means including a reading signal processing circuit for processing a reading signal from said photodetector and outputting a bivalued signal, wherein said a reading signal processing circuit comprises:

a first differentiating means differentiating said reading signal from said photodetector with a first set differential constant;

a second differentiating means differentiating said reading signal from said photodetector with a second set differential constant different from that of said first differentiating means;

a first comparing means comparing a first differential signal output by said first differentiating means with a first set threshold value and outputting a first output signal;

a second comparing means comparing a second differential signal output by said second differentiating means with a second threshold value different from that of said first comparing means and outputting a second output signal; and a bivalued signal logical means for producing and outputting a bivalued signal corresponding to said recorded information in said recording medium by receiving said first output signal of said first comparing means and said second output signal of said second comparing means.

2. A reading signal processing circuit in an optical information reproducing apparatus according to claim 1, wherein:

said second differentiating means is set at said second differential constant corresponding to a crossing of a zero point when said reading signal of said detector reaches a peak level; and said first differentiating means is set at said first differential constant larger than said second differential constant of said second differentiating means.

3. A reading signal processing circuit in an optical information reproducing apparatus according to claim 1 or 2, wherein:

said first threshold value of said first comparing means is set to be higher than said second threshold value of said second comparing means to obtain an output signal from which the noise produced in said reading signal of said photodetector is substantially removed.

4. A reading signal processing circuit in an optical information reproducing apparatus according to claim 2, wherein:

said first threshold value of said first comparing means is set to be higher than said second threshold value of said second comparing means to obtain an output signal from which the noise produced in said reading signal of said photodetector is substantially removed; and said second comparing means sets said second threshold value so that said peak point of said reading signal of said photodetector is detected when said second differential signal crosses said zero point at said peak point of said reading signal of said photodetector obtained by said second differentiating means.

5. A reading signal processing circuit in an optical information reproducing apparatus according to claims 2 to 4, wherein said bivalued signal logical means obtains a gate latch signal from a timing of said first output signal of said first comparing means and obtains a bivalued signal corresponding to said peak point of said reading signal of said photodetector by making said bivalued signal rise or fall based on the timing of an output signal of said second comparing means, wherein said bivalued signal rising or falling while said latch signal is output.

6. A reading signal processing circuit in an optical information reproducing apparatus according to claim 2 to 5, wherein said bivalued signal logical means obtains said bivalued signal by making said bivalued signal fall or rise after a predetermined time from the timing of the rising of the output signal of said second comparing means.

7. A reading signal processing circuit in an optical information reproducing apparatus according to claims 2 to 5, wherein said bivalued signal logical means obtains said bivalued signal by making said bivalued signal fall or rise after a predetermined time from the timing of the rising of an output signal of said second comparing means, wherein after said predetermined time said latch signal also rises or falls.

8. A reading signal processing circuit as recited in claim 2, wherein said second differentiating means is set at said second differential constant corresponding to an output of said second differentiating means crossing a zero point when said reading signal of said photodetector reaches a peak level.

* * * * *